United States Patent [19]

Winzer

[11] 4,302,071
[45] Nov. 24, 1981

[54] ADJUSTABLE DIRECTIONAL COUPLER FOR LIGHT WAVEGUIDES

[75] Inventor: Gerhard Winzer, Munich, Fed. Rep. of Germany

[73] Assignee: Siemens Aktiengesellschaft, Berlin & Munich, Fed. Rep. of Germany

[21] Appl. No.: 96,919

[22] Filed: Nov. 23, 1979

[30] Foreign Application Priority Data

Dec. 13, 1978 [DE] Fed. Rep. of Germany ....... 2853800

[51] Int. Cl.³ .............................................. G02E 1/01
[52] U.S. Cl. ................................ 350/96.20; 350/96.15
[58] Field of Search ........................... 350/96.15, 96.20

[56] References Cited

U.S. PATENT DOCUMENTS

| | | | |
|---|---|---|---|
| 4,135,779 | 6/1979 | Hudson | 350/96.20 |
| 4,136,929 | 1/1979 | Suzaki | 350/96.15 |
| 4,176,908 | 12/1979 | Wagner | 350/96.20 |

FOREIGN PATENT DOCUMENTS 53-25792  9/1979  Japan ............................... 350/96.15

OTHER PUBLICATIONS

T. Ozeki et al., "Optical Directional Coupler Using Tapered Sections in Multimade Fibers", Appl. Phys. Letts., vol. 28, No. 9, May 1975, pp. 528–529.

B. S. Kawasaki et al.: "Low-Loss Access Coupler . . ." Applied Optics, vol. 16, No. 7, Jul. 1977, pp. 1794–1795.

A. Jones, "Coupling of Optical Fibers and Scattering in Fibers", Journal of Optical Soc. of Amer., vol. 55, No. 3, Mar. 1965, pp. 261–271.

D. Kendall, "On Etching Very Narrow Grooves in Silicon," Appl. Phys. Lett., vol. 26, No. 4, Feb. 1975, pp. 195–198.

Primary Examiner—Stewart J. Levy
Attorney, Agent, or Firm—Hill, Van Santen, Steadman, Chiara & Simpson

[57] ABSTRACT

A coupler for coupling a light signal traveling in a light conducting core of one light waveguide into the light conducting core of a second waveguide with an adjustable ratio of the amount of coupling therebetween characterized by a pair of support members for mounting the waveguides in a fixed position along a coupling segment with the waveguides substantially parallel and being embedded in a medium with an index of refraction which is lower in comparison to the index of refraction of the cores, each of the support members being mounted for relative movement to each other from a first position with the waveguides in alignment with each other to a second position with the waveguides separated and displaced from each other and a device for moving the support members between the positions in the prescribed amounts to change the ratio of the light signal coupled from one waveguide to the other waveguide. Preferably the waveguides, which may be either optical fibers or strip waveguides, are disposed adjacent flat planar surfaces of the support and the device for moving may be a piezoelectric device that either shifts the support members between the first and second positions in a direction extending parallel to the plane of the surfaces so that a lateral offset occurs between the waveguides when in the second position or moves the members apart to separate the waveguides.

9 Claims, 5 Drawing Figures

ADJUSTABLE DIRECTIONAL COUPLER FOR LIGHT WAVEGUIDES

BACKGROUND OF THE INVENTION

The present invention is directed to a directional coupler for coupling a light signal traveling in a light conducting core of one waveguide to the light conducting core of a second waveguide with an adjustable ratio of the amount of light coupled between the cores. The adjustable ratio in the amount of light, which is being coupled, is a division ratio of the coupler and is understood to be the ratio of the intensity of the light being coupled to the second waveguide relative to the intensity or amount of light remaining in the first waveguide.

In the employment of light waveguides for example in optical communication technology, devices are required in order to couple light into one optical waveguide partially or entirely from another optical waveguide such as between first and second optical fibers. This can occur for example if the optical fibers are laid next to one another and in contact along a certain length or coupling segment. In an article, B. S. Kawasaki and K. O. Hill, "Low-Loss Access Coupler for Multimode Optical Fiber Distribution Networks", *Applied Optics*, Vol. 16, No. 7, July 1977, pp. 1794-5, a coupler was described in which two fibers were twisted with respect to one another and are heated locally so that the fibers in the twisted zone are drawn up to a biconical form and are fused together. In this coupler 3.82% through 24% of the light traveling in one fiber is coupled over into the other fiber. However, it is difficult to reproducibly manufacture the coupler with a selected one of these division ratio and the ratio cannot be adjusted.

In an article by Alan L. Jones, "Coupling of Optical Fibers and Scattering in Fibers", *Journal of the Optical Society of America*, Vol. 55, No. 3, March 1965, pp. 261-71, the radiation of a light from one optical fiber into a second optical fiber laid parallel thereto is theoretically investigated. In the article it is shown that a complete coupling over is possible between the two identical waveguides, which have the same propogation constant, when the coupling segment corresponds to an uneven multiple of a coupling length $L_0$. This coupling length $L_0$ is all the greater when the distance between the cores of the light waveguides becomes greater. If a coupling segment $L \leq L_0$, the coupling decreases exponentially when the relationship of the distance of the waveguides to the penetration depth of the electrical field increases in the medium connecting the waveguides. The penetration depth in turn depends on the difference between the index of refraction of the waveguide and the index of refraction of the surrounding medium and decreases as this difference increases. When observing a specific coupling constant and due to this property, a multimode of magnitudes must be held within narrow tolerances which raises technological problems in the manufacture of such couplers and these problems have not been solved up to now. At present, a subsequent adjustment of the directional coupler to a desired division ratio, for example and adjusted to a specific wave length or under certain conditions, a modulation of the division ratio, has been achieved up to now by changing the index of refractions.

SUMMARY OF THE INVENTION

The object of the present invention is to provide an adjustable light coupler for light waveguides in which the division ratio of the light coupled between the two waveguides to the light remaining in the one waveguide can be subsequently adjusted to a specific value by means of an operation which is as simple as possible. Such an optical coupler for example can be operated as a switch in order to couple the light beam in the one optical waveguide such as an optical fiber into or out of the waveguide; however, it can also be periodically actuated and be employed for the modulation of the light.

To accomplish these tasks, the present invention is directed to a directional light coupler for the coupling of light signals traveling in a light conducting core of one light waveguide into the light conducting core of a second light waveguide with an adjustable ratio of the amount of the coupling therebetween. The coupler comprises a pair of support members for mounting each waveguide in a fixed position along a coupling segment, said support members holding the waveguides substantially parallel in the coupling segment and the waveguides being embedded in a medium with an index of refraction which is lower in comparison to the index of refraction of the cores of the waveguides, each of said support members being mounted for relative movement to each other from a first position with the waveguides in alignment with each other and either in contact or almost in contact to a second position with the waveguide separated and displaced from each other, and means for moving the support members between said positions in prescribed amounts to change the ratio of the light signal coupled from one waveguide to the other waveguide.

If the light waveguides together with their support members are arranged with respect to one another in an extreme position so that they are practically in contact, a large part of the light signal in one of the waveguides can be coupled over into the other waveguide. Given low scattering losses and suitable coupling lengths, practically the entire light signal can be coupled from the first to the second waveguide. If for employment a division ratio between the maximum value and the minimum value, a so called band width, are required for the directional couplers, then the directional couplers can be first laid out so that the division ratio that exceeds the required maximum value is achieved in the extreme position which occurs when the waveguide cores are in contact with each other. The distance between the light waveguides can be increased and the division ratio will then assume any desired smaller value within the required band width in accordance with the interval between the two waveguides. Since the division ratio of a directional coupler with a given geometry depends on the wave length of the light being coupled over, the invention allows the employment of a directional coupler for various wave lengths, which coupler can be adapted for each wave length by means of changing the interval between the waveguides.

Optical fibers with a core with a high index of refraction and a cladding or casing with a low index of refraction, for example, monomode fibers can be employed as the light waveguides. The support members can advantageously be formed by substrate laminae consisting of ceramic, glass, particularly a photolithographically process glass, and anisotropically etchable silicon or the like which are provided with grooves in which the light waveguides are secured. The facing surfaces of these laminae can be made plane parallel for example by means of optical burnishing so that the cladding of the optical fiber is stripped until the cores are practically exposed. The polished surfaces of the laminae are laid against one another and adjusted in such a manner that the exposed fiber cores touch each other. In this extreme, first position, the maximum coupling over between the waveguides is achieved and the division ratio between the light intensity coupled into the second waveguide and the light intensity remaining in the first waveguide exhibits its highest value. During the polishing of the surfaces, a thin layer of the cladding material can be retained between the cores if desired.

Instead of the fibers with an encased core, a stripped waveguide can also be employed as a light waveguide. In a strip waveguide, the light conducting core is generated in a substrate strip of light transmitting material having a low index of refraction, for example lithium niobate, by means of diffusing a material, such as titanium, into the substrate strip. Particularly in this case of strip waveguides, the plane parallel aligned substrate laminae can be designated as a substrate strip of such a strip waveguide.

According to the invention, the device for forming the means for moving is arranged at the laminae, which form the support member, and thus the cores and the support members can be moved with a predetermined interval with respect to one another. With an increase in the interval or distance between the cores, the amount of coupling over is reduced. In order to obtain the desired, smaller division ratio, the means for moving only displaces the support members until the desired ratio is obtained. Since this amount of displacement can be undertaken subsequent to manufacture and the directional coupler need not be set to a desired division ratio at the time of manufacture.

It is particularly advantageous to employ a piezoelectric device as the means for moving the support members. For example, a piezoelectric device comprising a plurality of piezo laminae in a sandwich arrangement can be utilized with a horizontal layering being possible upon exploitation of the piezoelectric longitudinal effect of a vertical layering being possible upon an exploitation of the cross effect. Control voltages, which can be very low, are applied to the individual laminae by appropriate electrodes. Thus, the piezoelectric device functions as a spacer which assures a changeable interval between the support members. The spacers arranged between the two support members in such a manner that in one extreme location for example with no control voltage applied, the spacer ensures that the cores of the light conducting guides rest against one another. In the other extreme position for example at a given maximum control voltage, the two light waveguides are lifted from one another to such a degree that an intermediate space is generated between the cores or respectively the polished surfaces of the support members so that the coupling practically disappears. However, an arrangement is also possible in which the plane parallel surfaces of the support members always rest against one another and the interval between the cores is generated by means of displacement in the plane of the parallel surfaces. The piezoelectric ceramic device then serves as a lateral spacer in order to hold the support mounts at changeable intervals from a stop which is rigid moveable with respect to the other support member.

It is further advantageous to provide a supply space or reservoir for an immersion fluid, which has an index of refraction which is lower than the index of refraction of the cores. This supply space is connected with an intermediate space occurring between the cores. It is particularly desireable if the supply space is connected to the space between the members so that the immersion fluid flows into the intermediate space between the cores and the plane parallel surfaces of the support members when they are separated and moved toward the second position. The coupling over can be further influenced with the index of refraction of this immersion fluid.

If the interval between the cores is not produced by means of a piezoelectric ceramic device, but by means of other displacement mechanisms, then the division ratio or respectively the change of the light coupled over can be measured as a measurement for the amount of displacement. Thus, for example it is also possible to measure small lengths when the cores are displaced with respect to one another by the length to be measured.

DESCRIPTION OF THE PREFERRED EMBODIMENTS

Figure 1:
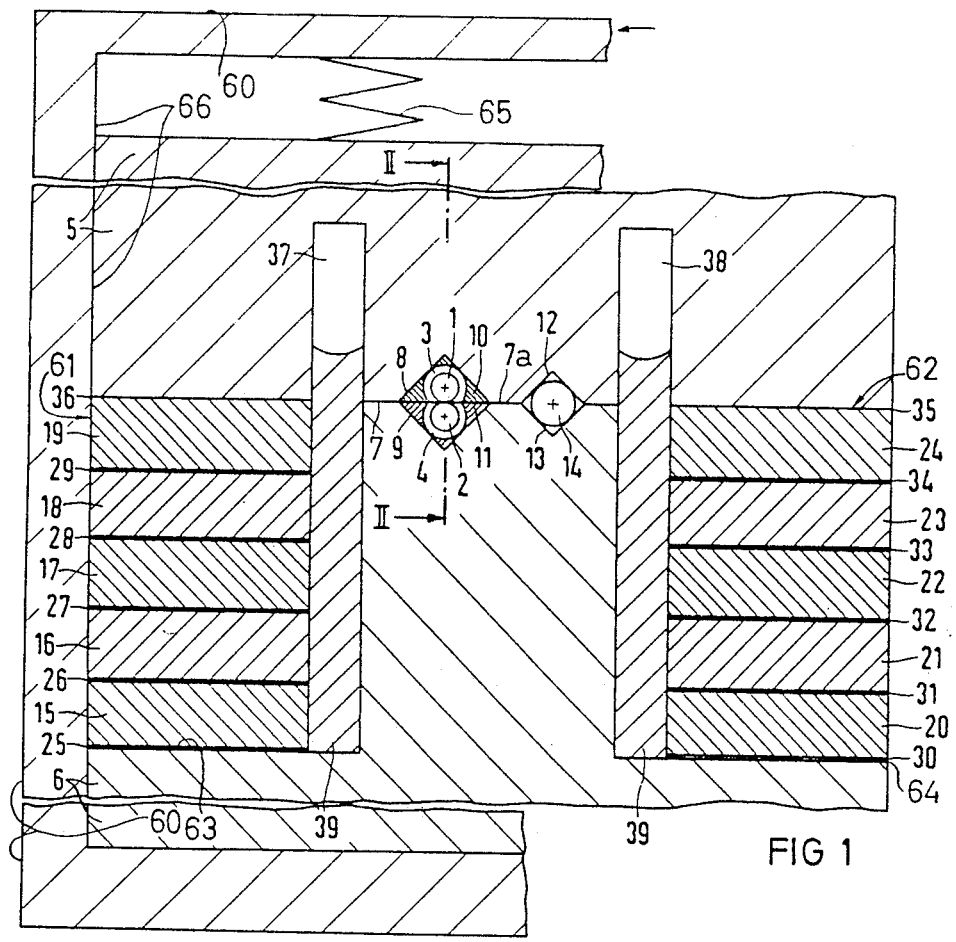
FIG. 1 is a cross-sectional view taken along the line I—I of FIG. 2 with portions in elevation and portions broken away for purposes of illustration of an embodiment of a coupling device in accordance with the present invention.
Figure 2:
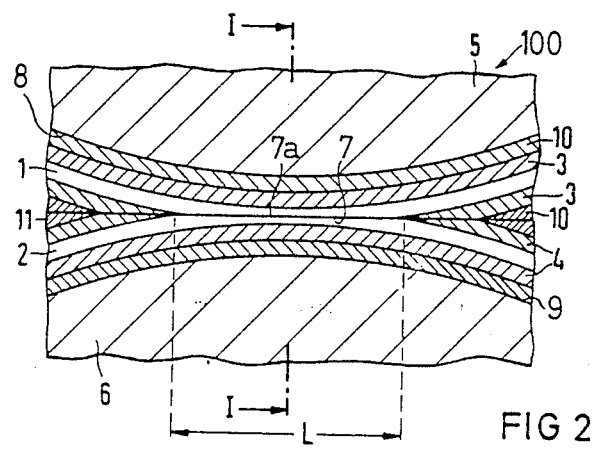
FIG. 2 is a cross-sectional view with portions removed for purposes of illustration taken along the lines II—II of FIG. 1.

The principles of the present invention are particularly useful in a directional coupling device generally indicated at 100 in FIGS. 1 and 2. The device 100 forms a coupling between two light waveguides comprising optical fibers having highly transparent fiber cores 1 and 2, which are each surrounded with a cladding or casing 3 and 4, which consists of a material with a lower index of refraction than the index of refraction of the cores 1 and 2. The claddings 3 and 4 are partially stripped in such a manner that the fiber cores 1 and 2 can contact one another.

To mount the two waveguides, support member 5 and 6, which are substrate bodies that are received in a clamp frame 60 are provided. The substrate bodies 5 and 6 are provided with plane parallel surfaces 7 and 7a which engage with each other. The fibers forming the waveguide are received in grooves 8 and 9, which are etched in the plane parallel surfaces 7 and 7a. As illustrated, the fiber which is formed by the core 1 and the cladding 3 is held in the groove 8 by an adhesive material 10 and the fiber which is formed by the core 2 and the cladding 4 is held in the groove 9 by an adhesive material 11. In addition to the grooves 8 and 9, each of the bodies 5 and 6 are provided with additional or adjustment grooves 12 and 13, which are also etched in the surfaces 7 and 7a and are spaced an equal distance from the grooves 8 and 9 to serve as adjustment aids by receiving adjustment members or bars for example a fiber piece 14. By the coaction of the fiber piece or bar 14 in the grooves 12 and 13, a precise emplacement of the bodies 5 and 6 is achieved so that the fiber cores 1 and 2 contact one another at their exposed surfaces.

To move the cores 1 and 2 from a first position, such as illustrated in FIGS. 1 and 2, to a second position with the cores 1 and 2 and the surfaces 7 and 7a being spaced apart, means for moving the two bodies 5 and 6 between the two positions are provided. The means comprises a pair of piezoelectric devices 61 and 62 which are received in recesses 63 and 64 of the member 6. The piezoelectric device 61 includes piezoelectric ceramic layers or members 15–19, which are arranged in the stack and the device 62 comprises piezoelectric ceramic layers or members 20–24 which are arranged in the stack. As illustrated, the layers 15–24 are provided with electrode layers 25–36, which are vapor deposited on the various members. By applying a control voltage to the electrode layers through appropriate contacts (not illustrated), the thickness of the devices 61 and 62 can be increased to lift the core 1 of the optical fiber from the core 2 of the other optical fiber as the surfaces of the members 5 and 6 are moved or spaced apart. It should be noted, that the division ratio is very sensitive to a change of the spacing between the cores 1 and 2. It is also noted that by an appropriate orientation of the polar axis of each of the piezoelectric laminae, the changes in the thickness of the individual piezoelectric layers will add up and thus practically all division ratios between zero and the highest value resulting in the position with the cores 1 and 2 in engagement with each other, which position is the highest value above the maximum value demanded by the device, can readily be obtained by means of the low controlled voltage to the piezoelectric devices 61 and 62.

As illustrated, between the recesses 63 and 64 which contain the piezoelectric devices 61 and 62, the bodies 5 and 6 are each provided with additional recesses 37 and 38, which provide a supply reservoir for an immersion fluid 39 which has an index of refraction lower than the index of refraction of the cores 1 and 2 of the optical fibers. When the optical surfaces 7 and 7a are lifted off of one another, this fluid 39 will flow into the space between the optical fibers and effects a transfer of the light of one fiber into the other with the transfer being low in scattered light.

The device 100 can be manufactured for example by using silicon laminae as the substrate bodies 5 and 6. For example the support mount body or member 5 is produced by engraving longitudinal slots 37 and 38 in a planar-plane-parallel pre-processed silicon laminae and the grooves 8 and 12 are also generated such as by etching. This can occur for example in a photolithographic manner by means of privilege or anisotropic etching by utilizing a silicon dioxide mask in a known manner such as discussed in an article by Don L. Kendall, "On Etching Very Narrow Grooves in Silicon", *Applied Physics Letter*, Vol. 26, No. 4, Feb. 15, 1975, pp. 195–198. After forming the groove 8, an optical fiber consisting of a core 1 and a cladding 3 is then glued in the groove such as by utilizing the adhesive 10. By means of optical burnishing, the laminae surface including the adhesive 10 and the casing or cladding 3 is stripped away until a portion of the core 1 of the optical fiber is exposed.

The support member 6 is manufactured from a silicon laminae with the surface profile that exhibits a projecting bar or ridge in the center between the side recesses 63 and 64. The bar or ridge receives and supports the optical fiber. The devices 61 and 62, which consists of the piezoelectric laminae 15–24 and the layers 26–34, are secured in the side recesses 63 and 64. Then the surface of each of the piezoelectric devices and/or the projecting bar are finished until they have a uniform height. Subsequently, the grooves 9 and 13 are created such as by etching in the same manner as the grooves 8 and 12 are etched in the member 5. The second optical fiber is then glued in the groove 9 and a planar surface is generated by means of optical burnishing so that the cladding 4 of the second optical fiber is stripped until the core 2 is exposed. Next an immersion fluid is placed in a reservoirs form by the slots 37 and 38 and a cylindrical bar, for example a piece of optical fiber, is inserted in the adjustment grooves to aid in positioning the two support members 5 and 6 as they are assembled together. It is possible to use other means such as a portion of the clamp frame 60 to aid in adjusting the positioning of two members 5 and 6. It should be noted, that the two members 5 and 6 are urged together by an elastic or spring member 65 of the clamp frame 60. By utilizing a lateral guidance such as a surface 66 of the clamp frame 60 that forms the mounting means for the members, parallel alignment of the optical fibers is retained even when the two members 5 and 6 are moved apart to move the two cores 1 and 2 away from each other in response to an application of a voltage to the piezoelectric devices 61 and 62.

Advantageously, the surfaces of the two support members, which are to form the planar surfaces 7 and 7a, have been preprocessed so as to have or be slightly convexed. Thus, the grooves 8 and 9 are curved and the optical fibers received in the grooves are bent in a curved path as illustrated in FIG. 2. After final polishing of the surfaces to obtain the parallel surfaces 7 and 7a, the cladding is stripped along a segment length L (FIG. 2) to define a coupling segment. It should be noted that the amount of curvature as well as the particular size of the parts has not been reproduced in scale in the drawings.

A typical fiber core diameter may be approximately 5 $\mu$m and have a cladding diameter of approximately 150 $\mu$m. If the index of refraction for the core material amounts to 1.5 and the index of refraction for both the cladding material and the immersion fluid is 1.495, then for a given wave length of 1 $\mu$m, a monomode behavior will be guaranteed. If the interval between the exposed surface of the cores amounts to 5 $\mu$m and the coupling segment amounts to 2.75 mm, practically complete coupling over of the light between the two fibers will occur. By utilizing a piezoelectric device having a thickness of approximately 25 $\mu$m and a 5 mm length, which device has a piezoelectric constant of 0.3 $\mu$m kV$^{-1}$ then an interval between the two members of 2 $\mu$m can be achieved with a control voltage of 33 volts. By so doing, the coupling constant for example the ratio of the light intensity of the amount of light coupled over versus the light intensity remaining in the fiber changes approximately by a factor of 4.

Instead of using optical fibers having a core 1 and a cladding 3, an embodiment of the coupler generally indicated at 100' uses strip waveguides 1' and 2'. When using strip waveguides, substrate members or bodies 5' and 6', respectively, of a highly transparent material, for example lithium niobate, are provided on a surface with the light wave conducting strips 1' and 2', which have a higher index of refraction and are generated by means of diffusing a foreign atom, for example, titanium, into the surface of the substrate. Advantageously, the substrate members 5' and 6' can be constructed to form the support members which are mounted for movement between a first position with the waveguides substantially in contact with each other to a position with the waveguides spaced from each other. As in the previously described coupler 100, means for moving the support members are provided and preferably comprise the piezoelectric devices which are not illustrated in FIG. 3.

Figure 3:
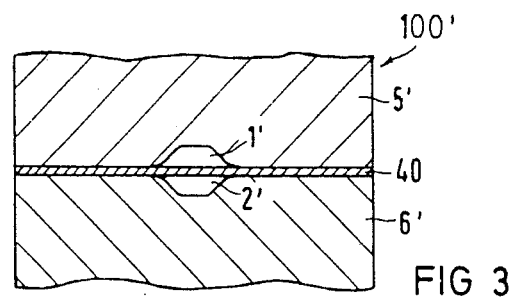
FIG. 3 is a partial cross-sectional view similar to the view of FIG. 1 of an embodiment of a coupler device in accordance with the present invention.

In the partial embodiment 100' of FIG. 3, the cores 1' and 2' of the strip waveguides do not need to be directly in contact at the plane parallel processed surface but are actually separated by a very thin layer 40 of a highly transparent material with a low index of refraction. For example the layer 40 may be either an epitaxial layer of the substrate material or a thin film of immersion fluid. Such a layer 40 which for example can have a thickness of approximately 2 to 4 μm causes a greater coupling length $L_0$ to be required for maximum coupling over of the light beam from the one waveguide into the other waveguides. Thus, the coupler 100' according to the invention can be adapted for various manufacturing tolerances and areas of use.

Figure 4:
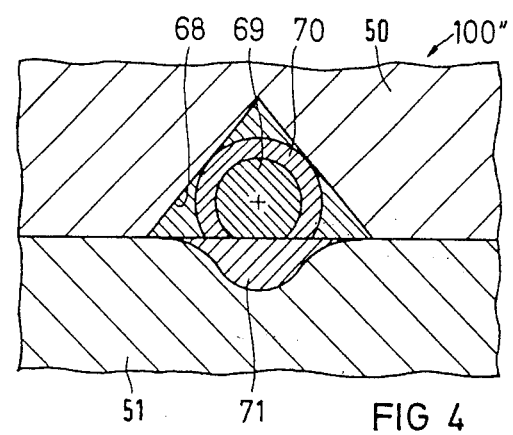
FIG. 4 is a partial cross-sectional view similar to FIG. 1 of a second embodiment of the present invention.
Figure 5:
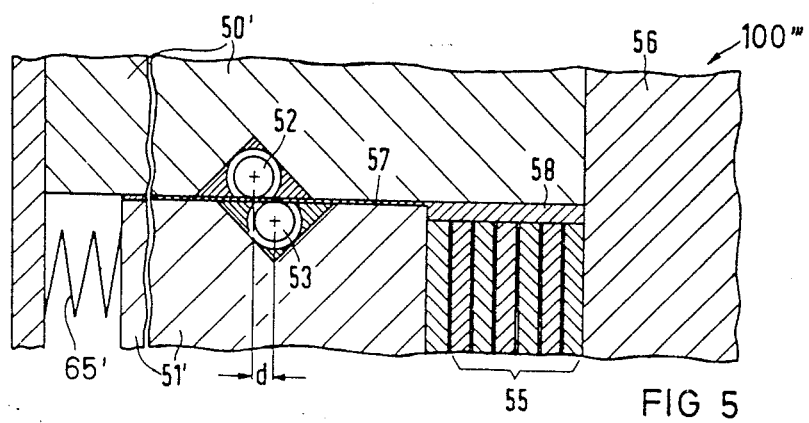
FIG. 5 is a partial cross-sectional view similar to FIG. 1 of a third embodiment of the present invention.

Another embodiment of the coupler is generally indicated at 100'' in FIG. 4. In this embodiment, the support members 50 and 51 have a plane parallel surface with the surface of the member 50 being provided with a groove 68 which receives a fiber having a core 69 and a cladding or casing 70. As illustrated, the fiber is secured in the groove 68 by an adhesive material and the surface of the member 50 and the fiber have been polished to remove a portion of the cladding 70 in the manner similar to the embodiments of FIG. 1. The support 51 is similar to the support members 5' and 6' and has been processed to have a strip waveguide 71. Thus, the embodiment of the coupler 100'' utilizes both an optical fiber and a strip waveguide as the two waveguides.

partially illustrated. The coupler 100''' has support members 50' and 51' which are provided with grooves on facing surfaces for receiving waveguides comprising cores 52 and 53, respectively, of optical fibers. As illustrated, both members 50' and 51' and the respective fibers have been polished so that a portion of their cladding layer is removed to expose the cores 52 and 53. As illustrated in FIG. 5, the center of the cores 52 and 53 are offset by a distance d. However, means for moving the members 50' and 51' comprises a piezoelectric device 55 which acts on one of the support members 51' and on seat formed by a stop member 56, which is rigidly connected to the support member 50'. As in the previous embodiments, the two core members do not need to actually be in contact with each other in order to achieve the maximum coupling over due to the provision of thin film 57 of an immersion fluid which is connected with a supply reservoir or space 58 to flow between the cores. In this embodiment, the film is very thin and only a low light loss occurs in the coupler. Actuation of the piezoelectric device 55 will shift the member 51' relative to the member 50' to a position with the cores 52 and 53 aligned with each other for maximum coupling. This shifting is again accomplished against means 65' that bias the member 51' toward the right as viewed in the drawings against the force created by the piezoelectric device 55.

With the tolerance provided during fabrication, the present invention allows the manufacturing of a coupler which has cores that can be brought into a precise adjustable interval with respect to one another by means of an adjustment operation which is easy to undertake after formation of the coupler. Thus, the desired division ratio can be obtained and can be set to prescribable values. By means of a periodic operation of the means for moving, for example by applying an AC voltage to the piezoelectric ceramic members of the piezoelectric device, an amplitude modulation of a coupled light can also be achieved.

Although various minor modifications may be suggested by those versed in the art, it should be understood that I wish to embody within the scope of the patent granted hereon, all such modifications as reasonably and properly come within the scope of my contribution to the art.

I claim:

1. A directional coupler for the coupling of a light signal traveling in a light conducting core of one light waveguide to the light conducting core of a second light waveguide with an adjustable ratio of the amount of coupling therebetween, said coupler comprising a pair of support members for mounting each waveguide in a fixed position along a coupling segment, each of the support members having a plane parallel surface facing each other, each of said plane parallel surfaces having means for receiving and holding the waveguide with the waveguides being substantially parallel in the coupling segment and the waveguides being embedded in a medium with an index of refraction which is lower in comparison to the index of refraction of the cores of the waveguides, each of said support members being mounted for relative movement to each other from a first position with the waveguides in alignment with each other to a second position with the waveguides separated and displaced from each other, and means for moving the support members between said position in prescribed amounts to change the ratio of the light signal coupled from one waveguide into the other waveguide so that when said support members are in said first position, said waveguides are in alignment with each other with the core close together and the plane parallel surfaces are substantially abutting each other.

2. A directional coupler according to claim 1, wherein said means for moving said members between said first and second positions moves said members in a direction perpendicular to the parallel plane surfaces so that the second position has the members spaced apart with the waveguides spaced from each other.

3. A directional coupler according to claim 1, wherein said means for moving the support members between said first and second positions moves said members in a plane extending parallel to the plane parallel surfaces so that the second position is a position with the waveguides being displaced our of alignment with each other.

4. A directional coupler according to claim 1, wherein said means for moving comprises at least one electrically bistable piezo ceramic device mounted on one of said support members and engaging a seat associated with the other of said support members, said piezo ceramic device causing said pair of support members to be moved between said first and second position in prescribable amounts by the means of appropriate electric bias voltages.

5. A directional coupler according to claim 4, wherein one of said support members has means forming a reservoir for an immersion fluid having an index of refraction lower than the index of refraction of the cores of said waveguides, said piezo ceramic device being positioned to lift one of the plane parallel surfaces of one of said support members from contact with the other plane parallel surface of the other support member with the immersion fluid flowing into the space therebetween.

6. A directional coupler according to claim 4, wherein one of said support members has a reservoir for an immersion fluid having an index of refraction lower than the index of refraction of the core of the waveguides, said piezo ceramic device being arranged and positioned to move the members relative to each other along a plane extending parallel to the plane parallel surfaces so that the waveguides are displaced between the first and second positions by the changing of the bias voltage applied to the piezo ceramic device.

7. A directional coupler according to claim 6, wherein the piezo ceramic device is positioned relative to the support member and the seat so that an application of a voltage to the device shifts the support members from the second position towards the first position to increase the amount of light coupled between the waveguide.

8. A directional coupler according to claim 1, for use in measuring small lengths, said small lengths to be measured being proportional to the amount of movement of the members between the first and second position and the amount of movement being sensed by determining the change in the intensity of light being coupled between the waveguides.

9. A directional coupler for the coupling of a light signal traveling in a light conducting core of one light waveguide to the light conducting core of a second light waveguide with an adjustable ratio of the amount of coupling therebetween, said coupler comprising a pair of support members for mounting each waveguide in a fixed position along a coupling segment, said support members holding the waveguides substantially parallel in the coupling segment and the waveguide being embedded in a medium with an index of refraction which is lower in comparison to the index of refraction of the cores of the waveguides, each of said support members being mounted for relative movement to each other from a first position with the waveguides in alignment with each other to a second position with the waveguides separated and displaced from each other, and means for moving the support members between said position in prescribed amounts to change the ratio of the light signal coupled from one waveguide into the other waveguide, said means for moving the support members between said positions comprising at least one electrically bistable piezo ceramic device mounted on one of said pair of members and engaging a seat fixably connected to the other of said support members so that the application of a bias voltage to the device causes said device to shift the support members between said positions in a prescribable amount proportional to the applied voltage.

* * * * *